INVENTOR
G.E. HENNING

Patented Nov. 1, 1949

2,486,474

UNITED STATES PATENT OFFICE 2,486,474

EXTRUDING AND PROCESSING APPARATUS

George E. Henning, Baltimore, Md., assignor to Western Electric Company, Incorporated, New York, N. Y., a corporation of New York Application December 15, 1947, Serial No. 791,751

8 Claims. (Cl. 18—13)

This invention relates to extruding and processing apparatus, and particularly to apparatus for extruding and vulcanizing insulating and jacketing material upon conductors.

In the manufacture of filamentary articles composed either wholly or partially of vulcanized material, such as, for example, insulated or jacketed conductors, a vulcanizable compound is sometimes advanced continuously under heat and pressure through an extrusion head by means of a stock screw acting in an extrusion cylinder to which the extrusion head is bolted. It has been proposed that a strainer be positioned between the extrusion cylinder and the extrusion head to prevent lumps of the extruded material or extraneous matter from appearing in the finished product. An extruding die is secured at the exit end of the extrusion head to form the extruded compound into a filament. The filament then is advanced through a splice box, which is connected to the exit end of the extrusion head and to a vulcanizing tube, and into and through the vulcanizing tube.

Debris collects on the strainer so that the strainer must be cleaned or replaced relatively frequently during the operation of such apparatus. To clean the strainer, the extrusion operation is stopped, the extrusion head is unbolted and disconnected from the extrusion cylinder, the strainer is cleaned or replaced, the apparatus is reassembled and the extrusion operation is started again. Hitherto, the time required to disconnect the extrusion head from the cylinder has been excessive.

An object of the invention is to provide new and improved extruding and processing apparatus.

Another object of the invention is to provide new and improved extruding and vulcanizing apparatus having parts that may be assembled and disassembled rapidly.

An apparatus illustrating certain features of the invention includes an extrusion cylinder, a chamber for processing organic material extruded by the extrusion cylinder, an extruding head movable between engaging and disengaging positions with respect to the extrusion cylinder, and a generally tubular body mounted for movement toward and away from the extruding head when the extruding head is in said closed position for connecting the extruding head to the processing chamber.

A complete understanding of the invention may be obtained from the following detailed description of an apparatus forming a specific embodiment thereof, when read in conjunction with the appended drawings, in which.

Figure 1:
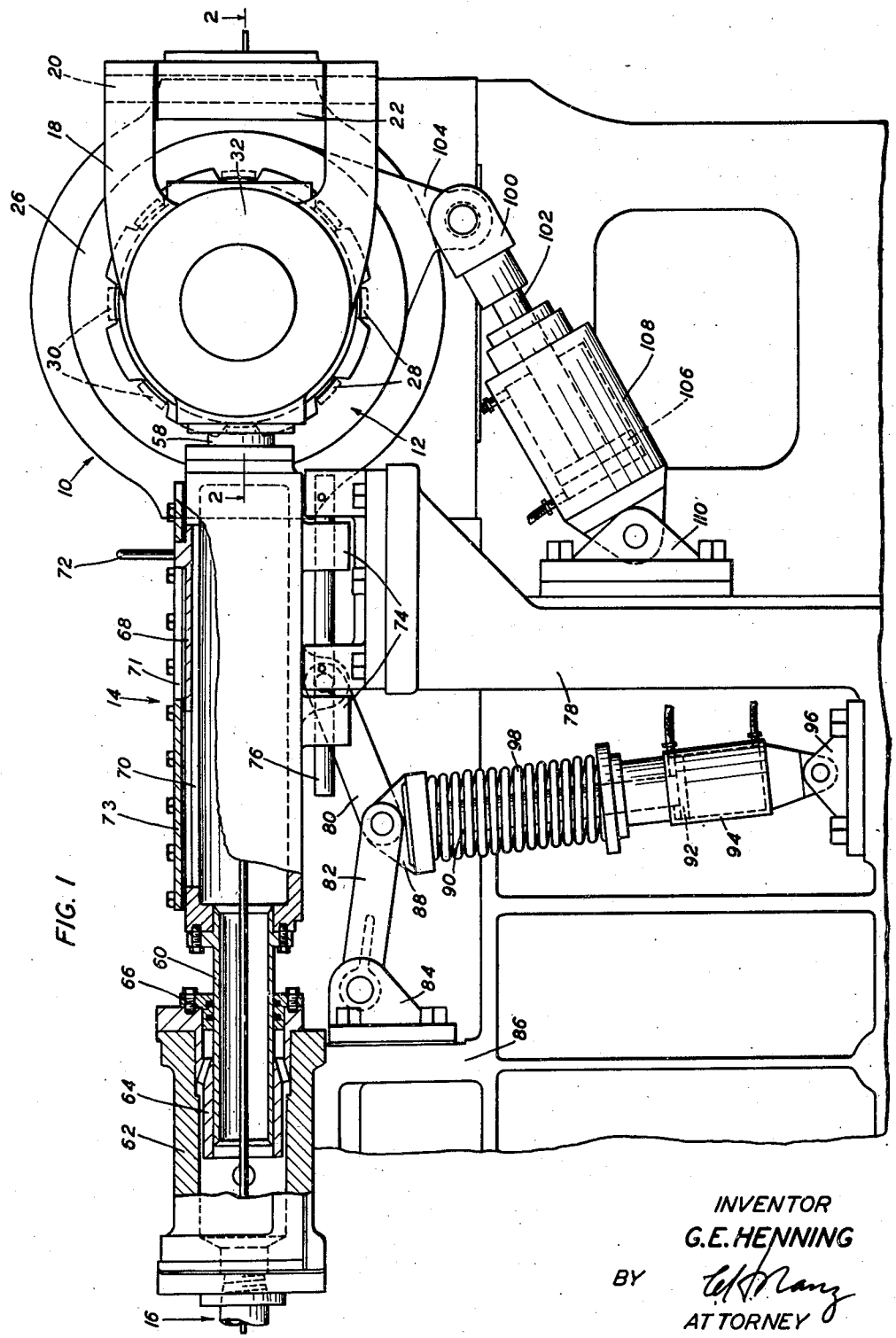
Fig. 1 is a fragmentary, front elevation of an extruding and vulcanizing apparatus embodying the invention with portions thereof shown in section.

Referring now in detail to the drawings, there is shown therein a continuous extruding and vulcanizing apparatus, which includes an extrusion cylinder 10, an extruding head 12, and a splice box 14, which is telescopically mounted with respect to a vulcanizing tube 16 and serves to connect the extruding head to the vulcanizing tube in pressure-tight relationship. The extruding head 12 is mounted pivotally with respect to the extrusion cylinder 10 by a yoke 18, a pintle 20 and a bracket 22 fixed to the extrusion cylinder. These elements form a loose pivotal connection between the extruding head and the extrusion cylinder. A male threaded member 24 is fixed to the extruding head and a female threaded collar 26 is mounted thereon. The collar 26 is provided with camming segments 28—28 for engaging camming segments 30—30 formed on a body member 32 of the extrusion head 12. The camming segments 28—28 and 30—30 and the members 24 and 26 form a breech lock to selectively secure the extrusion head 12 tightly to the end of the extrusion cylinder and press the extrusion head 12 tightly against the extrusion cylinder to form a sealed joint therebetween.

The extrusion head 12 includes a backing plate 36 secured to the body member 32 thereof, a straining screen 38 mounted removably therein, a tool holder 40, a die holder 42, a die 44, a core tube 46, a core tube holder 48 and a lock nut 50. An adapter 52 is fixed to the body member 32 of the extrusion head, and has a gasket seat 54 formed thereon, in which gaskets 56—56 are seated. An end 58 of the splice box 14 is designed to be pressed tightly against the gaskets 56—56 to form a pressure-tight joint therewith. A tube 60 secured to the splice box 14 is mounted telescopically with respect to the vulcanizing tube 16 by means of a cylinder 62 and a sleeve 64 fastened in the cylinder 62. The sleeve 64 supports the end of the tube 60 slidably. A packing gland 66 serves to provide a seal between the tube 60 and the cylinder 62.

The splice box 14 (Fig. 1) includes a cover plate 68 mounted slidably in a guide 70. The cover plate 68 may be manually slid to one side by a handle 72 to uncover an opening 71 in a cover 73 to provide access to the interior of the splice box to string cores through the apparatus. The splice box is provided with bearings 74—74 which are designed to slide upon a guide rod 76 supported by a standard 78. A link 80 is pivotally secured to the splice box 14 and to a link 82, which is pivotally secured to a bracket 84 mounted on a fixed support 86. A bracket 88 secured to a piston rod 90 is pivotally secured to the links 80 and 82 at their junction point and forms a toggle joint linkage therewith.

Figure 2:
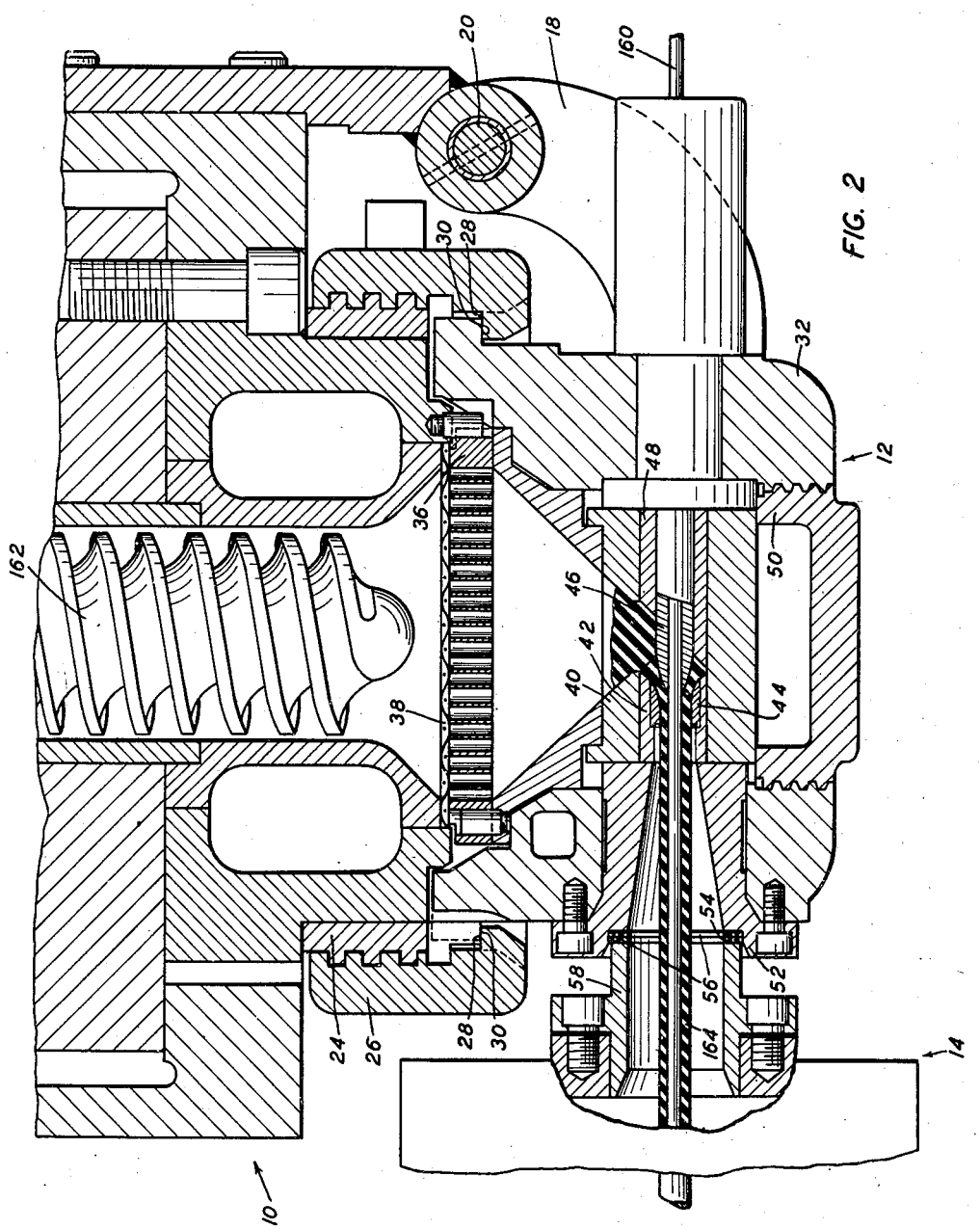
Fig. 2 is an enlarged, horizontal section taken along line 2—2 of Fig. 1.

The piston rod 90 is secured to a piston 92 mounted slidably in a cylinder 94, which is pivotally secured to a bracket 96, and a compression spring 98 normally urges the bracket 88 upwardly, as viewed in Fig. 1, to tend to move the splice box 14 to the right to press the end 58 of the splice box tightly against the gaskets 56—56 (Fig. 2). When hydraulic liquid under pressure is introduced into the upper end of the cylinder 94, it moves the piston 92 downwardly therein to move the splice box to the left, as viewed in Fig. 1, which moves the end 58 of the splice box 14 completely away from the extrusion head 12.

A clevis 100 secured to a piston rod 102 is pivotally secured to a lug 104 fastened to the collar 26. A piston 106 is mounted slidably in a cylinder 108, which is pivotally secured to a bracket 110 fixed to the standard 78. When hydraulic liquid under pressure is introduced into the upper end of the cylinder 108, as viewed in Fig. 1, the piston 106 is forced downwardly to the position in which it is shown in the drawings. This movement rotates the collar 26 on the member 24 to lock the extrusion head 12 to the extrusion cylinder 10. When hydraulic fluid is introduced into the lower end of the cylinder 108, the piston 106 is moved upwardly therein, and the collar 26 is moved in a counterclockwise direction to free the extrusion head from the extrusion cylinder.

In order to prevent damage to the apparatus by movement of the extrusion head 12 when the splice box 14 is in engagement with the gaskets 56—56, it is essential that the extrusion head 12 be locked to the extrusion cylinder 10 before the splice box 14 is moved into sealed relationship with respect to the cylinder, and to move the splice box 14 away from the extrusion head before the extrusion head is unlocked and moved away from the extrusion cylinder. To accomplish these ends, a control system 112 (Fig. 3) is provided. The control system includes an electric motor 114, which, when energized, serves to drive a pump 116 which pumps a hydraulic fluid, such as oil, under pressure from a storage tank 118 through a pipe 120 to a solenoid-actuated, four-way valve 122 of a well known type.

When the extrusion head 12 (Fig. 1) has been swung manually to a closed position with respect to the extrusion cylinder 10 (Fig. 1) and it is desired to lock the head to the extrusion cylinder and to move the splice box 14 into pressure-tight engagement with the head 12, the valve 122 is actuated manually to connect the pipe 120 with a pipe 124 and to connect a pipe 126 to an exhaust pipe 128 leading back to the supply tank 118. Fluid under pressure then passes through the pipe 124 and a flexible conduit 130 into the upper end of the cylinder 108 to move the piston rod 102 rapidly to the left, as viewed in Fig. 1. Hydraulic fluid is forced from the lower end of the cylinder 108 through a flexible conduit 132 and a pipe 134 to a sequence valve 136 of a well known type, which permits rapid flow of fluid from the pipe 134 to a pipe 138, connected to the pipe 126. Thus, the hydraulic liquid is pumped rapidly into the upper end of the cylinder 108 and is exhausted rapidly from the lower end of the cylinder 108 so that the head 12 (Fig. 1) is locked quickly.

Figure 3:
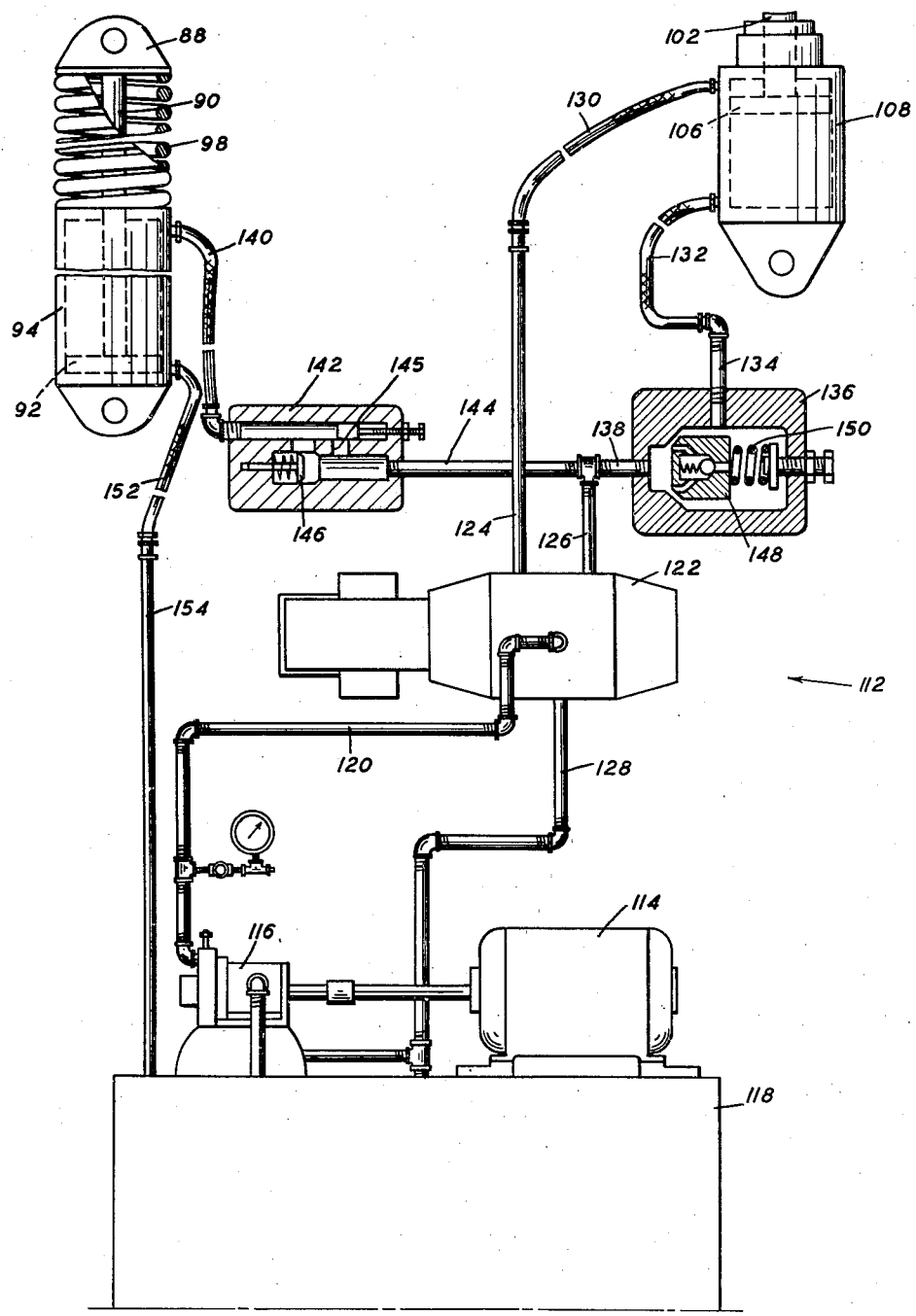
Fig. 3 is a schematic view of a portion of the apparatus.

When the pipe 126 is connected to the exhaust pipe 128 by actuation of the valve 122 to start to lock the head 12 rapidly, the pressure on the liquid in the upper end of the cylinder 94 is relieved so that the compression spring 98 moves the piston rod 90 slowly upwardly, as viewed in Fig. 3, to move the splice box 14 (Fig. 1) slowly toward the extrusion head. As the piston 92 is moved upwardly, it forces hydraulic liquid from the upper end of the cylinder 94 through a flexible conduit 140 into a flow control valve 142 of a well known type. The valve 142 restricts the rate of flow of the hydraulic liquid from the flexible conduit 140 to a pipe 144 connected to the pipe 126 by permitting the liquid to flow only through a restricted, adjustable orifice 145. As a result, the liquid in the upper end of the cylinder 94 prevents the splice box 14 (Fig. 1) from being closed rapidly. Thus, the head 12 is locked before the end 58 of the splice box 14 engages the gasket 56. Hence, there is no shearing force on the gasket 56 in closing the head and the splice box.

When access to the interior of the head 12 is desired, the valve 122 (Fig. 3) is actuated to connect the supply pipe 120 to the pipe 126 and to connect the exhaust pipe 128 to the pipe 124. The pump 116 pumps the hydraulic liquid under high pressure rapidly through the pipe 126, the pipe 144, a lightly pressed check valve 146 of the flow control valve 142 and the conduit 140 into the upper end of the cylinder 94 to rapidly move the piston 92 downwardly. When the piston 92 reaches its lowermost position and the splice box 14 (Fig. 1) has been moved completely away from the extrusion head 12, the pressure on the hydraulic fluid in the pipes 126 and 138 begins to build up. After the pressure is built up to a predetermined value, it opens a closure member 148, which is pressed towards its closed position by a strong compression spring 150, and flows through the pipe 134 and the conduit 132 into the lower end of the cylinder 108 to unlock the head 12 (Fig. 1) from the cylinder 10 rapidly. The hydraulic liquid in the upper end of the cylinder 108 is exhausted through the conduit 130, the pipe 124, the valve 122 and the exhaust pipe 128.

That is, when the head 12 is to be opened, the hydraulic liquid is supplied rapidly to the pipes 138 and 144 by the pipe 126, but the liquid at this time is not under a pressure sufficiently high to open the closure member 148 while it is high enough to move the piston 92 downwardly, as viewed in Fig. 3. Any hydraulic liquid which might leak past the piston 92 into the lower portion of the cylinder 94 is drained from the cylinder 94 through a flexible conduit 152 and a pipe 154 connected with the supply chamber 118. However, after the piston 92 has been moved to the lower end of the cylinder 94, and the pump 116 continues to work, the pressure on the hydraulic liquid is built up rapidly to a value sufficiently to move the closure member 148 of the sequence valve 136 to an open position so that the fluid passes into the lower end of the cylinder 108 and unlocks the head 12.

When the head 12 is locked to the cylinder 10 and the splice box 14 is moved into sealed relationship with respect to the head, a core 160, which may be a bare or covered conductor is strung through the core tube holder 48, the core tube 46, the die holder 42, the splice box and the vulcanizing tube 16. The core is advanced continuously from right to left, as viewed in Fig. 2. A stock screw 162 is rotated to force plastic material through the extrusion cylinder and the head 12, and the die 44 forms the material into a covering 164 around the core. Steam is introduced into the vulcanizing tube to vulcanize the covering as the covered core is advanced therethrough.

*Operation*

To open the head 12 from the cylinder 10, the four-way valve 122 is actuated to connect the supply pipe 120 to the pipe 126 and the exhaust pipe 128 to the pipe 124. Hydraulic fluid then is pumped rapidly to the upper end of the cylinder 94, as viewed in Fig. 3, but is prevented at this time from entering the lower end of the cylinder 108 by the sequence valve 136. After the piston 92 has been moved to the bottom of the cylinder 94 to move the splice box 14 (Fig. 1) completely away from the extrusion head 12, the pressure on the liquid builds up and flows through the sequence valve 136 into the lower end of the cylinder 108 to rapidly unlock the extrusion head 12 (Fig. 1) from the extrusion cylinder 10. The flow control valve 142 permits rapid flow of the hydraulic liquid therethrough during this operation since the lightly pressed check valve 146 (Fig. 3) opens. The head 12 then may be swung manually completely away from the cylinder 10 to provide access to the back side of the head.

To reclose the apparatus, the head 12 is swung manually into a closed position, and the valve 122 (Fig. 3) is actuated to connect the supply pipe 120 to the pipe 124, and the exhaust pipe 128 to the pipe 126. When this occurs, the hydraulic liquid is pumped rapidly to the upper end of the cylinder 108 and is exhausted rapidly from the lower end of the cylinder 108, since the sequence valve 136 permits rapid flow of the liquid from the pipe 134 to the pipe 138, so that the head 12 (Fig. 1) is rapidly locked to the extrusion cylinder 10. While the head 12 is being locked to the cylinder 10 rapidly, the compression spring 98 (Fig. 3) urges the piston 92 upwardly and hydraulic liquid is forced thereby through restricted orifice 145 of the flow control valve 142, which permits the hydraulic liquid to flow therethrough from the conduit 140 to the pipe 144 very slowly. These operations are so timed that the splice box 14 (Fig. 1) is approaching the extrusion head 12 when the locking of the extrusion head 12 has just been completed. The flow of liquid from the upper end of the cylinder 94 (Fig. 3) continues until the splice box is in sealed engagement with respect to the extrusion head 12.

The above-described apparatus serves to provide ready access to the inside of the extrusion cylinder 10 and to the back side of the extrusion head 12, and also provides pressure-tight connections between the extrusion head 12 and the extrusion cylinder 10 and the splice box 14. Access to the straining screen 38 is provided rapidly so that the material in the cylinder 10 and the head 12 does not set therein. Furthermore, it is not necessary to unstring and restring the core 160 to clean or replace the screen and restart the extrusion and vulcanization.

What is claimed is:

1. An apparatus for forming plastic coverings over filamentary strands, which comprises an extrusion cylinder, an extrusion head designed to be moved into close fitting engagement with the extrusion cylinder, means for locking the extrusion head to the extrusion cylinder, a chamber for processing organic material extruded through the extrusion head, tubular connecting means movable from the material processing chamber toward and away from the extrusion head for connecting the chamber to the head, and means for actuating the locking means prior to movement of the connecting means into engagement with the extrusion head.

2. An extrusion apparatus, which comprises an extrusion cylinder, an extrusion head movable toward and away from the extrusion cylinder, means for moving the extrusion head toward the extrusion cylinder, means for selectively locking and unlocking the extrusion head from the extrusion cylinder, a material processing chamber, means selectively movable toward and away from the extrusion head to connect it to and disconnect it from the chamber, time delay means for sequentially locking the extrusion head to the extrusion cylinder and for moving the connecting means into engagement with the extrusion head, and time delay means for sequentially moving the connecting means out of engagement with the extrusion head and unlocking the extrusion head from the extrusion cylinder.

3. An extrusion apparatus, which comprises extrusion means, an extrusion head, means for locking the extrusion head in engagement with the extrusion means, a material processing chamber, means movable toward and away from the extrusion head for connecting the extrusion head to the material processing chamber, means for moving the connecting means into engagement with the extrusion head, quick-acting means for actuating the extrusion head locking means, and slow-acting means for actuating the connecting means moving means so that the extrusion head is locked in engagement with the extrusion means before the connecting means is moved into engagement therewith.

4. An extrusion apparatus, which comprises extrusion means, an extrusion head movable toward and away from the extrusion means, a material processing chamber, means movable toward the extrusion head for connecting the material processing chamber to the extrusion head, quick-acting means for moving the connecting means out of engagement with the extrusion head, and slow-acting means for unlocking the extrusion head from the extrusion means so that the connecting means is moved out of engagement with the extrusion head before the extrusion head is unlocked from the extrusion means.

5. An extrusion apparatus, which comprises an extrusion cylinder, an extrusion head designed to be moved into and out of engagement with the extrusion cylinder, a material processing chamber, means movable into and out of engagement with the extrusion head for connecting the extrusion head to and disconnecting it from the material processing chamber, hydraulic means including a sequence valve for locking the extrusion head quickly into engagement with the extrusion cylinder and for unlocking the extrusion head slowly from the extrusion cylinder, and means including a flow control valve for moving the connecting means slowly into engagement with the extrusion head and for moving the connecting means rapidly out of engagement with the extrusion head.

6. An extrusion apparatus, which comprises an extrusion cylinder, an extrusion head movable toward and away from the extrusion cylinder, means for locking the extrusion head in engagement with the extrusion cylinder, a material processing chamber, means movable toward and away from the extrusion head for connecting and disconnecting the extrusion head and the material processing chamber, means including a sequence valve for actuating the locking means to rapidly lock the extrusion head to the extrusion cylinder and for unlocking the extrusion head from the extrusion cylinder slowly, and means including a flow control valve for moving the connecting means into engagement with the extrusion head slowly and for moving the connecting means out of engagement with the extrusion head rapidly so that movements of the connecting means and the extrusion head are not concurrent.

7. An extrusion apparatus, which comprises an extrusion cylinder, an extrusion head movable toward and away from the extrusion cylinder, pressure-tight locking means for locking the extrusion head to the extrusion cylinder and for unlocking the extrusion head from the extrusion cylinder, a vulcanizing tube, a splice box mounted telescopically with respect to the vulcanizing tube for connecting and disconnecting the vulcanizing tube to and from the extrusion head, a toggle joint linkage for moving the connecting means into and out of engagement with the extrusion head, means including a flow control valve having a check valve and a restricted orifice in parallel with the check valve for actuating the toggle joint linkage to move the connecting means slowly into engagement with the extrusion head and to move the connecting means rapidly out of engagement with the extrusion head, means including a pressure responsive valve, and a check valve in parallel with the pressure responsive valve for causing the locking means to lock rapidly and to unlock slowly.

8. An extrusion apparatus, which comprises an extrusion cylinder, an extruding head movable toward and away from the extrusion cylinder, a vulcanizing tube, a splice box having a tubular end portion fitting telescopically with respect to the vulcanizing tube, a slide for supporting the splice box for movement toward and away from the extruding head, a toggle-joint linkage for moving the toggle-joint linkage toward and away from the extruding head, means for urging toggle-joint linkage in a manner such as to urge the splice box into engagement with the extruding head, a cylinder, a piston connected to the cylinder and to the toggle-joint linkage, and selectively operable means for introducing a hydraulic fluid under pressure into an end of the cylinder to move the toggle-joint linkage against the action of the linkage-urging means to move the splice box away from the extruding head.

GEORGE E. HENNING.

REFERENCES CITED

The following references are of record in the file of this patent:

UNITED STATES PATENTS

| Number | Name | Date |
|---|---|---|
| 1,993,384 | Royle | Mar. 5, 1935 |
| 2,035,247 | Royle | Mar. 24, 1936 |
| 2,069,087 | Forstrom et al. | Jan. 26, 1937 |
| 2,438,003 | Edwards et al. | Mar. 16, 1948 |